United States Patent
Akagi et al.

(10) Patent No.: US 6,810,859 B2
(45) Date of Patent: Nov. 2, 2004

(54) CONTROL SYSTEM OF INTERNAL COMBUSTION ENGINE WITH OUTPUT CORRECTING MEANS OF THERMAL TYPE AIR FLOW SENSOR

(75) Inventors: Yoshihiko Akagi, Hitachinaka (JP); Hiroshi Hirayama, Hitachinaka (JP); Takuto Okamoto, Hitachinaka (JP); Kazuhiko Miya, Hitachiota (JP); Hatsuo Nagaishi, Yokohama (JP); Tetsuya Iwasaki, Tokyo (JP)

(73) Assignees: Hitachi, Ltd., Tokyo (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/618,739

(22) Filed: Jul. 15, 2003

(65) Prior Publication Data

US 2004/0020471 A1 Feb. 5, 2004

(30) Foreign Application Priority Data

Jul. 19, 2002 (JP) ........................................ 2002-211328

(51) Int. Cl.$^7$ .............................................. F00M 51/00
(52) U.S. Cl. ...................... 123/488; 123/494; 73/118.2; 73/204.11
(58) Field of Search ................................ 123/488, 494; 73/118.2, 204.11–204.26

(56) References Cited

U.S. PATENT DOCUMENTS

| | | | | |
|---|---|---|---|---|
| 5,086,745 A | * | 2/1992 | Nishimura et al. | 123/494 |
| 5,301,126 A | * | 4/1994 | Nishimura et al. | 702/45 |
| 6,349,596 B1 | * | 2/2002 | Nakada et al. | 73/204.26 |
| 6,662,640 B2 | * | 12/2003 | Yagi | 73/118.2 |

FOREIGN PATENT DOCUMENTS

| | | |
|---|---|---|
| JP | 5-288113 | 11/1993 |
| JP | 6-033825 | 2/1994 |
| JP | 9-158758 | 6/1997 |

* cited by examiner

Primary Examiner—John T. Kwon
(74) Attorney, Agent, or Firm—Mattingly, Stanger & Malur, P.C.

(57) ABSTRACT

Disclosed here is a control unit employed for an internal combustion engine and provided with air flow sensor output correcting element capable of correcting a detected voltage error to occur in the air flow sensor according to a surge voltage and a supply voltage at each actuation of the thermal type air flow sensor. The thermal type air flow sensor output correcting element includes surge time measuring element for measuring a surge time in a value detected in the thermal type air flow sensor at the time of the sensor power on and supply voltage detecting means. The output correcting element thus calculates a warming-up characteristic correction amount for the thermal type air flow sensor according to the measured surge time and the detected supply voltage.

12 Claims, 9 Drawing Sheets

SYSTEM BLOCK DIAGRAM

CONTROL SYSTEM OF INTERNAL COMBUSTION ENGINE WITH OUTPUT CORRECTING MEANS OF THERMAL TYPE AIR FLOW SENSOR

FIELD OF THE INVENTION

The present invention relates to a control system of an internal combustion engine provided with a thermal type air flow sensor and more particularly to a control system of an internal combustion engine for correcting both surge voltage and warming-up characteristic of the thermal type air flow sensor when the air flow sensor starts so as to correct the intake air flow detected value according to the initial temperatures of both temperature sensing and heating resistors of the thermal type air flow sensor.

BACKGROUND OF THE INVENTION

It has been a conventional method that disposes a temperature sensing (thermal type) air flow meter in an intake air pipe of an internal combustion engine so as to detect the intake air flow in the engine. The temperature sensing (thermal type) air flow meter has such internal circuits as a temperature sensing resistor and a heating resistor used to detect the intake air flow respectively. In the temperature sensing (thermal type) air flow meter, the heating resistor is disposed in the intake air passage that receives a current and releases its heat at a constant temperature, thereby the temperature drop to be caused by the intake air is prevented with an increase of the supply of the current. The air flow meter calculates the intake air flow from the supplied current value.

However, such a temperature sensing (thermal type) air flow meter generates a detection error in a period between when the meter is powered and when the heating resistor reaches the normal control temperature. This is why the air flow meter detected value must be corrected for a predetermined time after the sensor is powered. And, to solve the conventional problem, there has been disclosed a technique (JP Patent Application No. 7-318118(1995) (JP Patent Publication (Kokai) No. 9-158758 (1997))) that calculates a warming-up correction factor for correcting an intake air flow signal according to an elapsed time after ignition switch ON and the warming-up characteristic of the temperature sensing (thermal type) air flow sensor using means for measuring a time elapsed after the ignition switch ON and means for estimating the warming-up characteristic of the temperature sensing (thermal type) air flow sensor from the water temperature at the starting time of the sensor.

There is also disclosed another technique (JP Patent Publication (Kokai) No. 6-33825(1994)) for correcting the starting time characteristic of such a thermal type air flow sensor according to the results of the measurements of the last power-on time, the last power-off time, and the current power-on time. Concretely, the correcting technique is employed as means for correcting the starting time characteristic of the thermal type air flow sensor described above when the sensor is powered soon after the power-off state so as to prevent the temperature of the heating resistor from falling nearly to the room temperature after the power-off.

There is disclosed proposed still another technique (JP Patent Publication (Kokai) No. 5-288113(1993)) for correcting the starting time characteristic of such a thermal type air flow sensor according to the results of measurements of the last power-off time and the current power-on time, as well as a time on which a predetermined voltage value of the thermal type air flow sensor is exceeded at starting time of the sensor.

Each of the conventional techniques described above, however, includes a problem that the detection accuracy is deteriorated when the equilibrium is lost from among the temperature of the engine water, the temperature of the temperature sensing resistor, and the temperature of the heating resistor of the thermal type air flow sensor. This is because the initial temperature of the thermal type air flow sensor is estimated from the temperature of the engine water at the starting time of the sensor. Concretely, the initial temperatures of the temperature sensing resistor and the heating resistor of the thermal type air flow sensor do not fall so much even when the engine water is low in temperature if the engine stops before it is warmed up, then it starts again soon. In that state, the equilibrium is lost. If the engine starts in such a state, a detection error occurs.

If the initial temperature of the thermal type air flow sensor is estimated from the power-on and power-off times, the last power-off time must always be measured. Thus, the CPU operation must be continued even at the power-off time of the engine, thereby the sensor needs time measuring means for such a measurement. The power consumption therefore comes to increase, since the CPU power cannot be turned off until the engine cools down completely after its power-off. The power wiring system must be checked.

Further, in the case of the conventional technique for correcting the warming-up characteristic of the thermal type air flow sensor according to the time on which the voltage of the air flow sensor at its starting time exceeds a predetermined voltage, the time depend strongly on the supply voltage. This is because falling of the supply voltage causes degradation in the heating performance of the heating resistor and the temperature sensing resistor, thereby the correction amount varies significantly according to the changes of the supply voltage to be caused by how much the battery is charged, the power consumption variation of each accessory member, a sudden fluctuation in the power source at the time of starter switch ON, etc. This has also been a problem.

Under such circumstances, it is an object of the present invention to provide a control system employed for an internal combustion engine provided with a thermal type air flow sensor. The control system is provided with means for correcting the output of the air flow sensor, which is capable of correcting a detected voltage error according to both of the surge voltage and the supply voltage of the sensor when the sensor is started.

SUMMARY OF THE INVENTION

In order to solve the above conventional problems, the control system of the present invention employed for an internal combustion engine is basically provided with means for correcting the output of the thermal type air flow sensor. The output correcting means includes surge time measuring means for measuring a surge time in a value detected by the thermal type air flow sensor when the air flow sensor is powered, as well as supply voltage detecting means. The thermal type air flow sensor output correcting means calculates a warming-up characteristic correction amount for the air flow sensor according to the values of the measured surge time and the detected supply voltage. Concretely, the output correcting means estimates the initial temperature of the thermal type air flow sensor element according to the values of the measured surge time and the detected supply voltage, then calculates the warming-up characteristic correcting amount of the thermal type air flow sensor from the estimated initial temperature.

In the control system of the present invention employed for an internal combustion engine and configured as described above, it is possible to correct an output error of the detected voltage properly according to a high voltage output (surge) caused by, for example, a temperature rise of the air flow sensor heating resistor to occur just after the air flow sensor is started. Consequently, the intake air amount of the engine is detected accurately when the engine is started. The starting time variation is thus reduced, thereby the CO and the hydrocarbon included in the exhaust gas is reduced at the starting time of the engine.

The high voltage output (surge) is detected in the temperature rising process of the heating resistor and the high voltage output (surge) time is measured by the surge time measuring means. The surge time of the heating resistor often depends on the supply voltage (ex., battery), so that it is possible to correct the surge time according to the value of the supply voltage so as to correct the output error of the thermal type air flow sensor, thereby calculating the intake air amount of the engine accurately.

Further, in another concrete aspect of the control system of the present invention employed for an internal combustion engine, the thermal type air flow sensor output correcting means includes means for correcting the measured value of the surge time according to the supply voltage during the surge time measurement. The output correcting means calculates a squared average value of the values obtained respectively by subtracting a predetermined value 1 from the supply voltage during a surge time measurement at the starting time of the air flow sensor, then calculates a warming-up characteristic correction amount for the air flow sensor according to the squared average value. Then, the output correcting means estimates a surge time from the squared average value in the normal condition, then calculates the warming-up characteristic correction amount for the thermal type air flow sensor from the estimated surge time. Further, the output correcting means uses a predetermined value 2 as a supply voltage at a resetting time and a total of the measured value and a predetermined value 3 as a surge time to calculate the squared average value of the values obtained respectively by subtracting the predetermined value 1 from the supply voltage during a surge time measurement.

The control system of the present invention employed for an internal combustion engine and configured as described above can correct the surge time measured in the state of the supply voltage during a surge time measurement. Consequently, the surge time is estimated more accurately. It is also possible to correct the surge time measured according to the heating performance calculated during the surge time of the heating resistor of the air flow sensor by subtracting the internal loss of the transistors and resistors in the driving circuit of the air flow sensor from the supply voltage during the surge time measurement by calculating the squared average value of the values obtained respectively by subtracting the predetermined value 1 from the supply voltage during the surge time measurement. Thus, the surge time is estimated more accurately.

Further, according to still another concrete aspect of the present invention, in the control system employed for an internal combustion engine, the predetermined value 3 is a total time of a standard ECU hardware resetting time and a standard software resetting time. The predetermined value 2 is a supply voltage value stored beforehand in a memory system provided in the ECU when the ignition switch is on and the engine isn't driven. The predetermined value 2 is a value assumed just after the ECU is powered. In addition, the warming-up characteristic correction is not made for the thermal type air flow sensor if no surge voltage is detected when the air flow sensor is started after the ECU is powered.

The control system of the present invention employed for an internal combustion engine and configured as described above estimates a surge time obtained by adding a total time of a standard ECU hardware resetting time and a standard software resetting time to a measured value, so that the surge time is estimated accurately and it is possible to determine the temperature of the heating resistor of the air flow sensor to be high from the beginning if no surge voltage is detected in the air flow sensor actuated after the ECU is powered. The intake air amount of the engine is thus detected without making no warming-up characteristic correction for the air flow sensor.

Further, according to still another aspect of the present invention, the control system employed for an internal combustion engine further includes intake air amount detecting means other than the thermal type air flow sensor, determining means for determining whether or not the value detected by the intake air amount detecting means is equal to or smaller than a predetermined value, and correcting means for correcting a warming-up characteristic correction amount for the air flow sensor. The warming-up characteristic correction amount is corrected by the correcting means only when the intake air amount is determined to be equal to or smaller than the predetermined value. And, the intake air amount detecting means other than the thermal type air flow sensor uses at least one of the throttle opening, the accelerator opening, and the engine speed.

Because the control system of the present invention employed for an internal combustion engine and configured as described above is provided with the intake air amount detecting means other than the thermal type air flow sensor, it is possible to determine whether a detected high voltage of the air flow sensor is caused by a surge or intake air amount, thereby determining whether to request the correcting means to make a correction. In addition, because another detection signal obtained from the throttle opening, the accelerator opening, or the engine speed is used to detect an input to the intake air amount detecting means, no special detecting means is needed.

DETAILED DESCRIPTION OF THE PREFERRED EMBODIMENTS

Hereunder, an embodiment of the control system of the present invention employed for an internal combustion engine and provided with air flow sensor output correcting means will be described in detail with reference to the accompanying drawings.

Figure 1:
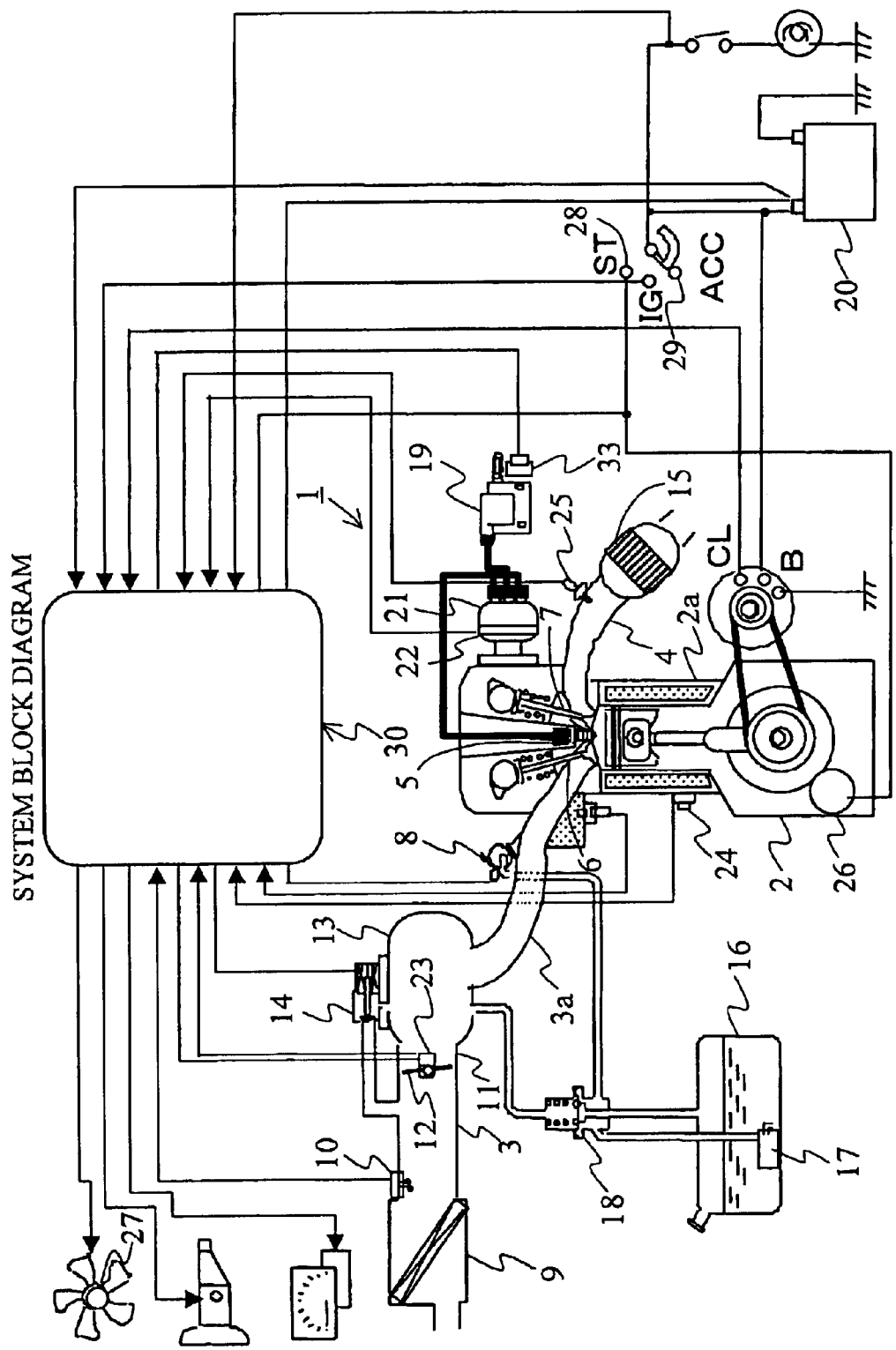
FIG. 1 is a system block diagram of an internal combustion engine for describing an embodiment of a control system of the present invention employed for the engine.

FIG. 1 shows a schematic block diagram of an entire internal combustion engine system provided with air flow sensor output correcting means in this embodiment.

In FIG. 1, an internal combustion engine 1 is a four-cylinder fuel injection that employs a so-called multi-point injection (MPI) method. An intake pipe 3 and an exhaust pipe 4 are connected to each cylinder 2 of the internal combustion engine 1 and an ignition plug 5 is disposed on the top of the cylinder 2. An injector 8 for injecting the fuel is attached to the intake pipe 3.

An air cleaner 9 is disposed at the inlet of the intake pipe 3 while a thermal type air flow sensor 10 is disposed at the downstream of the air cleaner 9. And, a throttle body 11 and a collector 13 are disposed at the downstream of the air cleaner 9.

The air led into each cylinder 2 passes through the air cleaner 9, then through the thermal type air flow sensor 10 and the throttle body 11 having a throttle valve 12 for controlling the air flow to be led into the collector 13. The air is also led into the collector 13 through an ISC valve 14 provided so as to bypass the throttle body 11. The air led into the collector 13 is distributed to an intake air branch pipe 3a that is part of the intake pipe 3, then sucked into the cylinder block 2a of each cylinder 2.

An intake valve 6 is disposed at the suction side of each cylinder 2 and the intake air branch pipe 3a is connected to the suction side while an exhaust valve 7 is disposed at the exhaust side of each cylinder 2 and the exhaust pipe 4 is connected to the exhaust side. The waste gas in the cylinder block 2a of each cylinder 2 is exhausted to the exhaust pipe 4 through the exhaust valve 7 and purified with catalyst 15, then discharged out of the engine 1.

The fuel burned in the cylinder block 2a of each cylinder 2 is sucked/pressed with a fuel pump 17 from a fuel tank 16 so that the pressure is adjusted at a constant value with a pressure regulator 18, then the fuel is injected into the intake air branch pipe 3a from an injector 8 provided in the intake air branch pipe 3a.

The ignition plug 5 receives a high voltage generated at an ignition coil 19 through a distributor 21 to generate sparks in the cylinder block 2a of each cylinder 2.

The internal combustion engine 1 is provided with a control unit (control system) 30 and the control unit 30 receives signals output, for example, from sensors disposed at some places of the engine 1 and outputs control signals calculated according to those received signals to the injector 8, the ignition coil 19, the throttle valve 12, etc.

The crank angle sensor 22 is built in the distributor 21. The sensor 22 outputs a pulse at each predetermined crank angle and the output signal is inputted to the control unit 30, thereby the crank angle and the engine speed are calculated and a basic pulse width equivalent to the charging efficiency is calculated from the intake air amount and the engine speed.

The throttle sensor 23 is attached to the throttle valve 12 and used to detect the opening of the throttle valve 12. The output signal of this throttle sensor 23 is also inputted to the control unit 30 to detect the fully closed position of the throttle valve 12, the acceleration, etc.

The water temperature sensor 24 is attached to each cylinder 2 to detect the temperature of the cooling water therein. The output signal of this sensor is also inputted to the control unit 30 to detect the warming-up state of the engine 1 and increase the amount of fuel injection, correct the ignition timing, control the on/off timing of the radiator fan 27, and set the target the engine speed when the engine is idling.

The air-fuel ratio sensor 25 is provided in the exhaust pipe 4 to output a signal in accordance with the oxygen content of the exhaust gas. This signal is also inputted to the control unit 30 to adjust the fuel injection pulse width so as to obtain the target air-fuel ratio (A/F).

A battery 20 is disposed in the internal combustion engine 1 and a starter 26 is connected to the engine 1 to start the engine 1. The battery 20 is connected to the starter 26, the control unit 30, the thermal type air flow sensor 10, etc. electrically to supply a power to them respectively. The battery 20 is connected to the starter 26 electrically through a starter switch 28.

Figure 2:
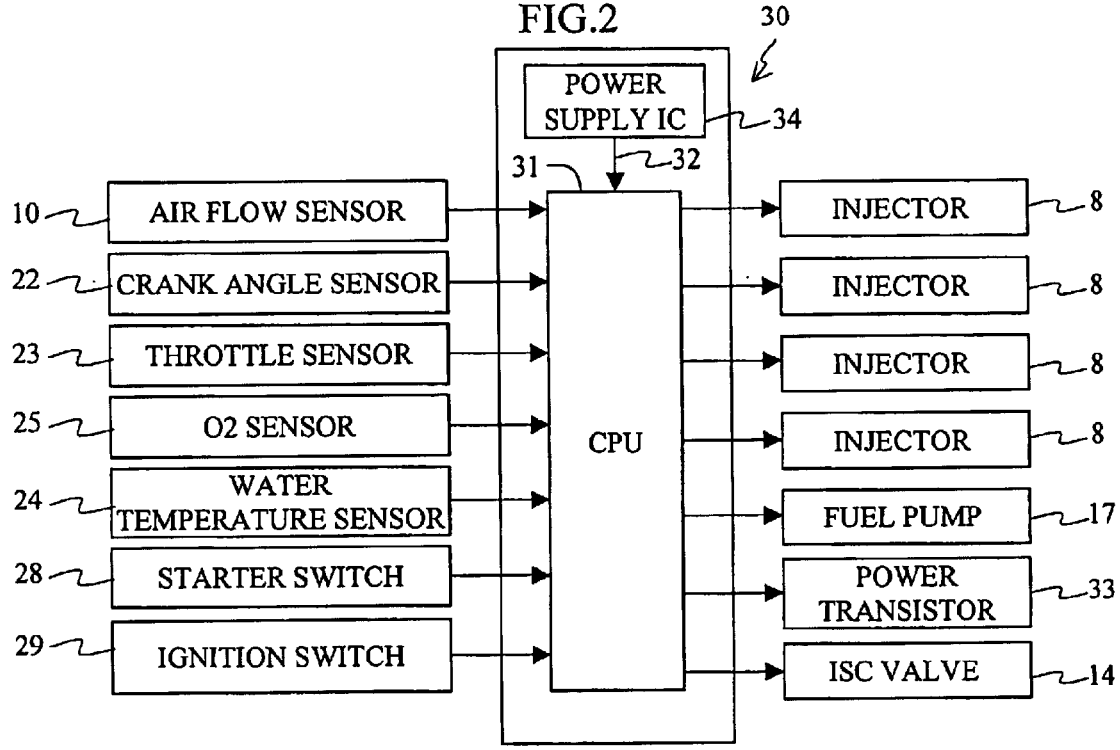
FIG. 2 is an internal block diagram of the control system employed for the internal combustion engine shown in FIG. 1.

FIG. 2 shows an internal block diagram of the control unit 30. The control unit 30 is configured by a CPU 31, a RESET signal terminal 32, and a power supply IC 34.

Signals are inputted to this control unit 30 from the air flow sensor 10, the crank angle sensor 22, the throttle opening sensor 23, the air-fuel ratio sensor 25, and the water temperature sensor 24 and powers are inputted to the control unit 30 from the starter switch 28 and the ignition switch 29. And, signals are outputted from the control unit 30 to the injector 8, the fuel pump 17, a power transistor 33, which is an ignition switch of the ignition plug 5, and the ISC valve 14. The RESET signal line 32 controlled by the power supply IC 34 is connected to the RESET terminal in the CPU 31.

The thermal type air flow sensor 10 is provided with a bypass path (not shown) and a heating resistor driving circuit.

Figure 3:
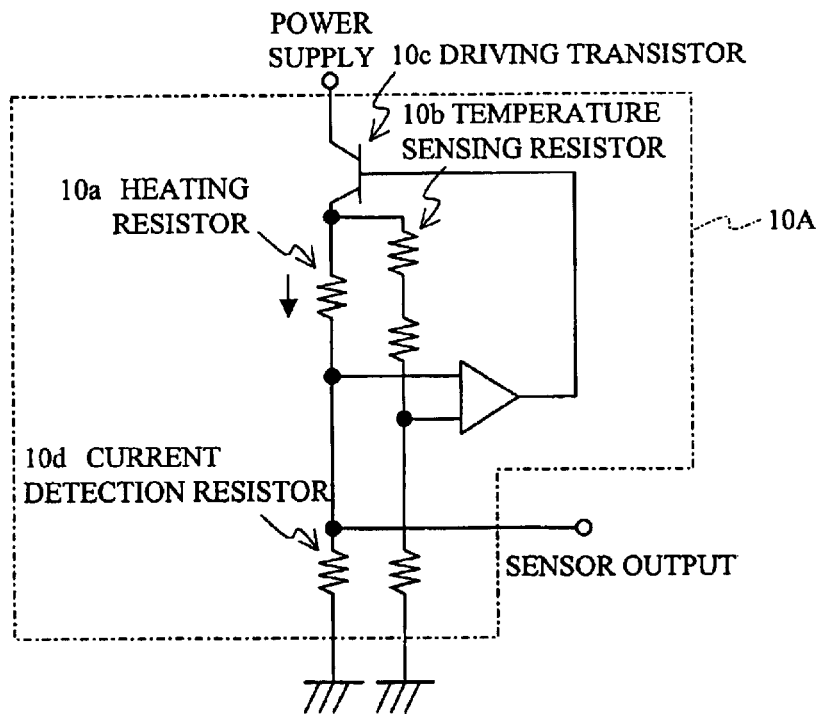
FIG. 3 is an internal circuit diagram of a thermal (heating resistor type) air flow sensor of the control system employed for the internal combustion engine shown in FIG. 1.

FIG. 3 shows a circuit diagram of the heating resistor driving circuit. The circuit is configured mainly of a heating resistor 10a, a temperature sensing resistor 10b, a driving transistor 10c, and a current detecting resistor 10d. In the bypass path are disposed the heating resistor 10a and the temperature sensing resistor 10b to detect the intake air flow. The heating resistor 10a and the temperature sensing resistor 10b are fastened to a supporting member and connected electrically to a control module included in the air flow sensor 10. The control module is an electronic circuit for heating and controlling the heating resistor 10a using an external power supply so that the heating resistor has a constant temperature difference from the temperature sensing resistor 10b. The control module transmits a flow signal obtained according to an amount of heating, which is an amount of heat release from the heating resistor to the air to the control unit 30 through a connector.

Next, the starting characteristic of the thermal type air flow sensor 10 will be described. When no power is supplied to the thermal type air flow sensor 10, the heating resistor 10a is not heated. The temperature of the resistor 10a is thus the same as that of the temperature sensing resistor 10b. When the ignition switch 29 is turned on, thereby the air flow sensor 10 is powered, the circuit module begins heating the heating resistor 10a so that the heating resistor 10a comes to have a constant temperature difference from the temperature of the temperature sensing resistor 10b. The heating resistor 10a having a thermal capacity consumes much power just after the air flow sensor 10 is powered. Consequently, just after the air flow sensor 10 is powered, the amount of heating increases even when the amount of heat release to the air is small. As a result, the flow signal rises to cause a surge voltage to be outputted.

Figure 4:
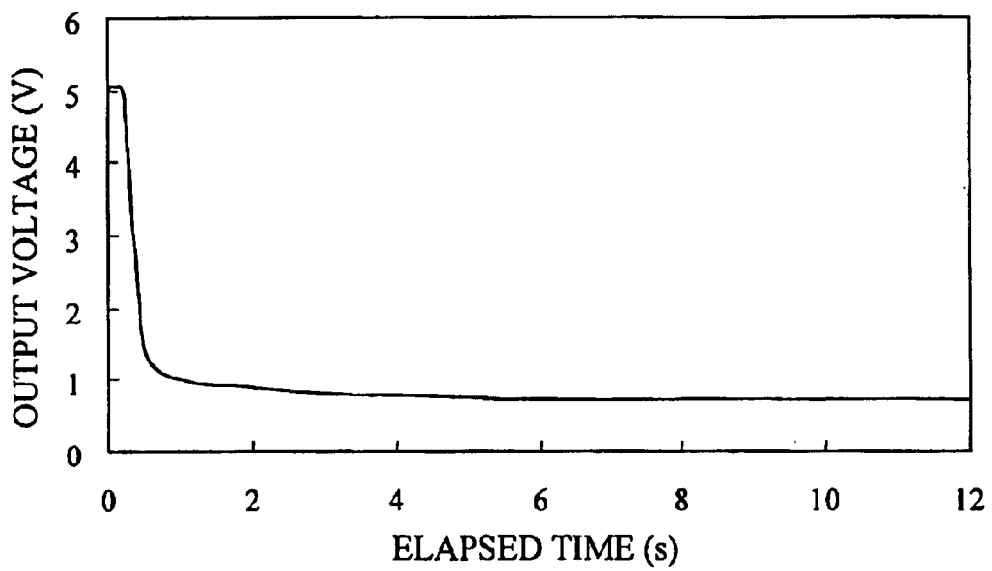
FIG. 4 is a chart for describing the behavior of an output voltage when the thermal type air flow sensor shown in FIG. 3 is powered.

FIG. 4 shows a graph of such a surge voltage. For a while even after such a surge voltage is generated, the flow signal output includes an error at the plus side, since the flow signal outputs a total of an amount of heat release to the air from the heating resistor 10a as a primary flow signal and other heats released to cool the supporting members.

Figure 5:
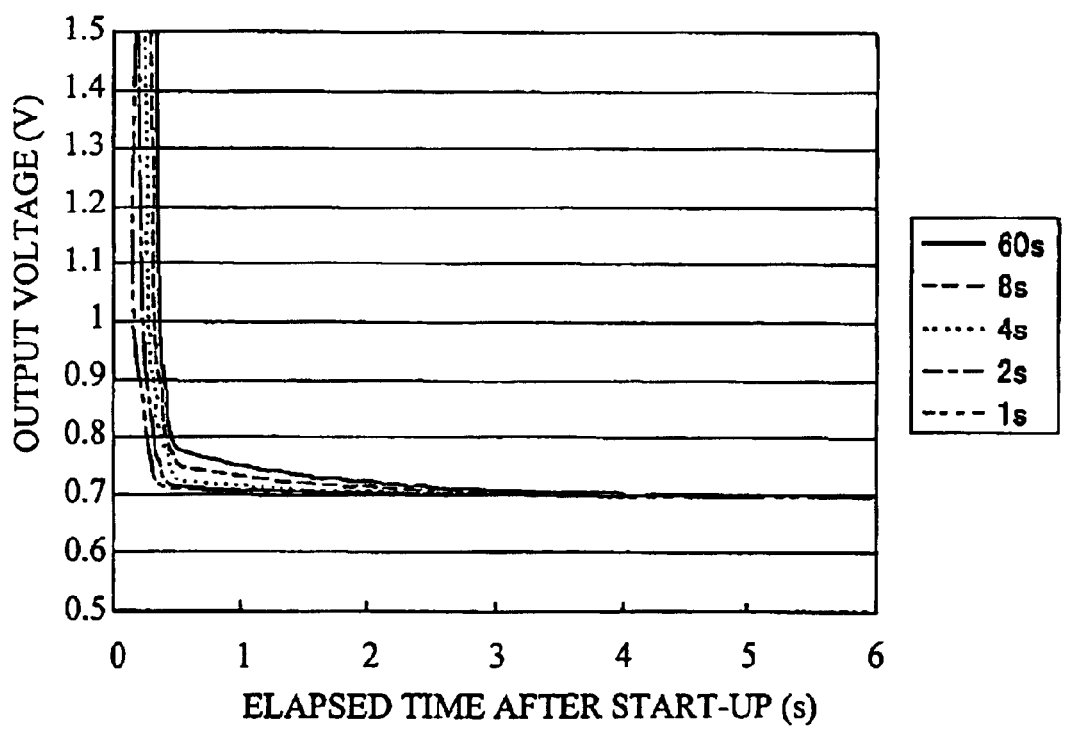
FIG. 5 is a chart for describing the dependency of the air amount detection error on the power-off time when the thermal type air flow sensor shown in FIG. 3 is powered.

If the initial temperature of the heating resistor 10a is high, the resistor 10a reaches its thermal equilibrium state quickly, so that the surge time becomes short. On the other hand, if the initial temperature of the heating resistor 10a is low, the heating resistor 10a takes a long time to reach the thermal equilibrium state, so that the surge time becomes long. FIG. 5 shows a graph of the characteristic as described above.

Actually, when the power supply to the air flow sensor 10 is shut off, for example, when the internal combustion engine 1 stops, the temperature of the heating resistor 10a goes closer to that of the temperature sensing resistor 10b step by step due to the natural heat radiation. The heating resistor 10a and the temperature sensing resistor 10b thus come to be almost the same in temperature at the next engine starting time. Sometimes, however, a power is supplied to the air flow sensor 10 to heat the heating resistor 10a before the heating resistor 10a cools down to the temperature of the temperature sensing resistor 10b, thereby the heating resistor 10a transmits its heat to the supporting member. In this case, the amount of heat release is smaller than the amount of heat release when the heating resistor 10a and the heat sensing resistor 10b are the same in temperature. Consequently, the warming-up characteristic correction amount of the air flow sensor 10 must be reduced in accordance with the (initial) temperature of the heating resistor 10a when the air flow sensor is powered.

And, as shown in FIG. 5, it will be understood that the plus side error still remains for a while after the surge disappears. The error and the surge time are proportional to each other; when one becomes larger/smaller when the other is longer/shorter. Consequently, it is possible to estimate the warming-up characteristic of the thermal type air flow sensor 10 by measuring the surge time. This surge time becomes further longer as the supply voltage falls at a surge occurrence.

Figure 6:
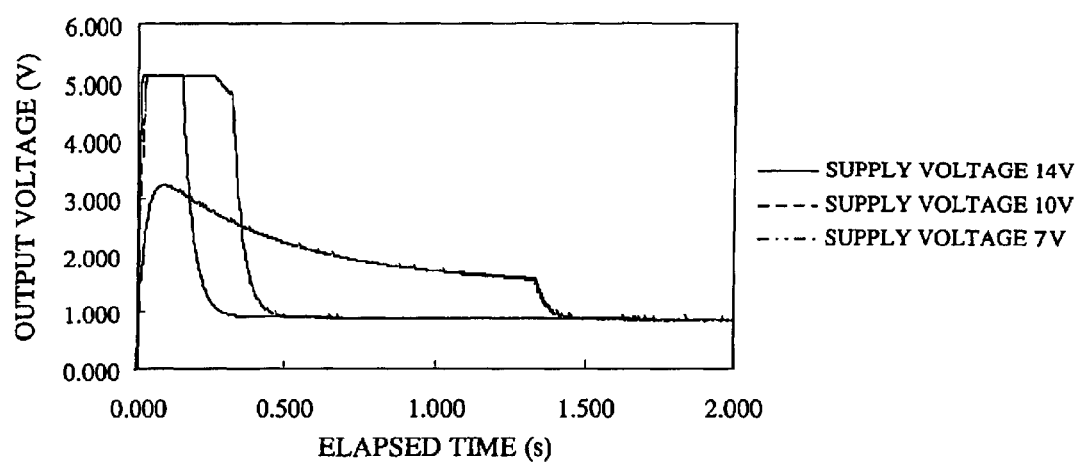
FIG. 6 is a chart for describing a relationship between a surge time and a supply voltage when the thermal type air flow sensor shown in FIG. 3 is powered.

FIG. 6 shows a graph for describing a relationship between a starting characteristic surge time and a supply voltage. As shown in FIG. 6, when insufficiency of the energy for heating is caused by a drop of the supply voltage, the surge time becomes long. It is thus possible to estimate the warming-up characteristic of the thermal type air flow sensor 10 accurately by estimating the heating performance of the sensor 10 from the supply voltage while the sensor 10 outputs a surge voltage at its starting time.

Figure 7:
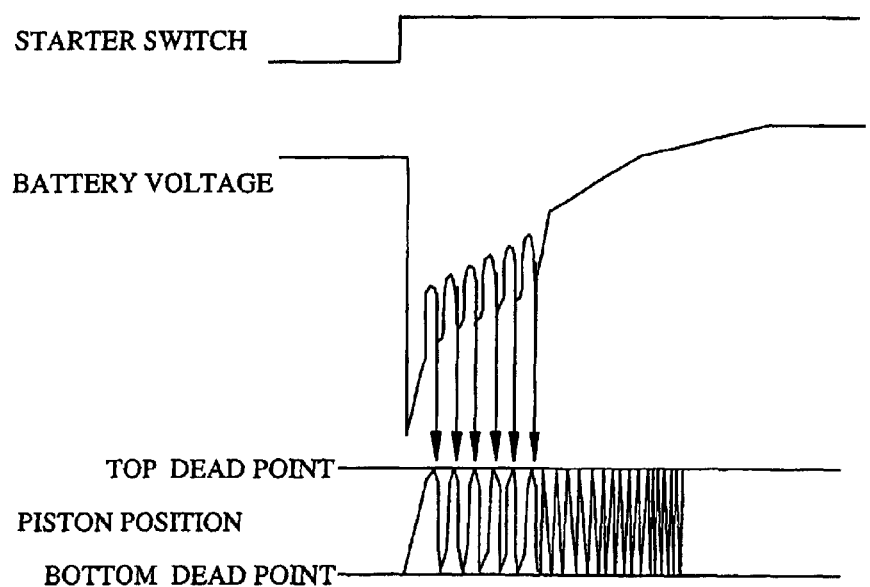
FIG. 7 is a chart for describing the behavior of a battery voltage while the control system of the internal combustion engine shown in FIG. 1 is cranking.

Next, an behavior of the battery voltage will be described. FIG. 7 shows a flowchart of such a battery voltage behavior while the control unit is cranking. The air flow sensor 10 and the starter 26 receive an operation power from the battery 20 respectively. When the starter 26 is to be driven, the starter needs a torque to compress the air in each cylinder block 2a before the piston of the engine 1 reaches the top dead point of the air compression. Thus, the compression consumes much current, thereby the voltage of the battery 20 falls and the supply voltage to the air flow sensor 10 varies. This is why the supply voltage must be corrected.

The supply voltage correction amount is obtained by subtracting a predetermined value 1 equivalent to such internal losses as those of the heating resistor driving circuit 10c, the resistor (see FIG. 3), etc. from the supply voltage at each predetermined time. The heating capability of the heating resistor 10a is calculated by squaring each of the voltages at both ends of the heating resistor 10a, integrating the result at each surge voltage occurrence, and then dividing the integration result by the surge voltage occurrence time after the surge voltage falls. When the heating capability is low in the standard power supply state, the surge time is extended. The detected surge time is thus corrected and decreased. When the heating capability is high in the standard power supply state, the surge time becomes short. The detected surge time is thus corrected and increased. In this connection, the detection accuracy is improved more if searching in tables is added to the process while the predetermined value 1 is handled as a fixed value here so as to make the calculation easier.

As described above, the thermal type air flow sensor 10 comes to include an error in its output for a while depending on its pre-actuation state after both surge voltage and surge time are detected. Such an output error affects the fuel injection pulse and other controls apparently. The control unit employed for an internal combustion engine in this embodiment thus corrects such an error to occur when the air flow sensor 10 is actuated.

Next, a description will be made for how the output of the air flow sensor 10 used in the control unit in this embodiment is controlled.

Figure 8:
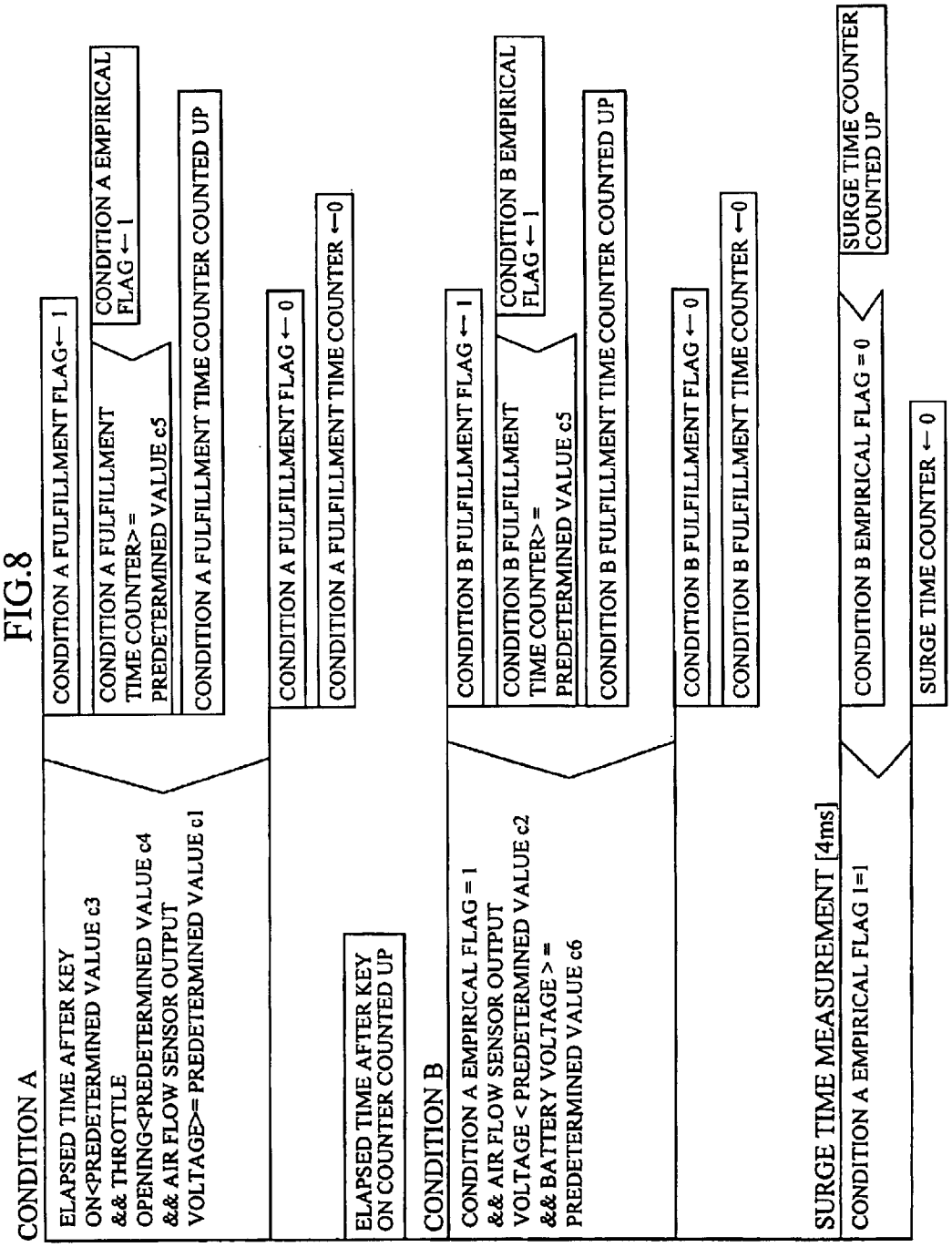
FIG. 8 is a PAD chart of a routine for measuring a surge time in the control system of the internal combustion engine shown in FIG. 1.

FIG. 8 shows a PAD chart of a routine for measuring a surge time. This routine is executed between when the output voltage of the air flow sensor 10 is a predetermined value c1 and over, and when the output voltage is equal to or smaller than a predetermined value c2. The predetermined value c1 compared with the output voltage of the air flow sensor 10 is assumed to be larger than the output voltage of the air flow sensor 10 when no surge occurs therein.

This routine processing fulfills the condition A when the value in the elapsed time after key-on (ignition switch on) counter that begins counting up when the ignition switch 29 is turned on is equal to or smaller than a predetermined value c3, the throttle opening is equal to or smaller than a predetermined value c4, and the air flow sensor output value is a predetermined value c1 and over. The routine then sets 'true' in the condition A fulfillment flag and counts up the value in the condition A fulfillment time counter. After that, when the value in the condition A fulfillment time counter is a predetermined value c5 and over, the routine sets 'true' in the condition A empirical flag. When the condition A is not fulfilled, the routine sets 'false' in the condition A fulfillment flag and initializes the condition A fulfillment time counter.

If 'true' is set in the condition A empirical flag, the air flow sensor output value is equal to or smaller than a predetermined value c2, and the battery voltage is a predetermined value c6 and over, the condition B is fulfilled and the routine sets 'true' in the condition B fulfillment flag and counts up the value in the condition B fulfillment time counter. After that, when the value in the condition B fulfillment time counter is a predetermined value c5 and over, the routine sets 'true' in the condition B empirical flag. When the condition B is not fulfilled, the routine sets 'false' in the condition B fulfillment flag and initializes the condition B fulfillment time counter.

If 'true' is set in the condition A empirical flag and 'false' is set in the condition B empirical flag, the routine counts up the value in the surge time counter. If 'false' is set in the condition A empirical flag, the routine initializes the value in the surge time counter.

After that, the routine repeats the detection until 'true' is set in the condition B empirical flag.

If 'true' is not set in the condition A empirical flag even after the value in the elapsed time after key-on counter reaches a predetermined value c3 and over, '0' is kept in the surge time counter, which denotes that no surge is generated in the air flow sensor output voltage. Thus, no warming-up characteristic correction is done. This is because the condition A is not fulfilled when the value in the elapsed time after key-on counter reaches the predetermined value c3 and over.

Figure 9:
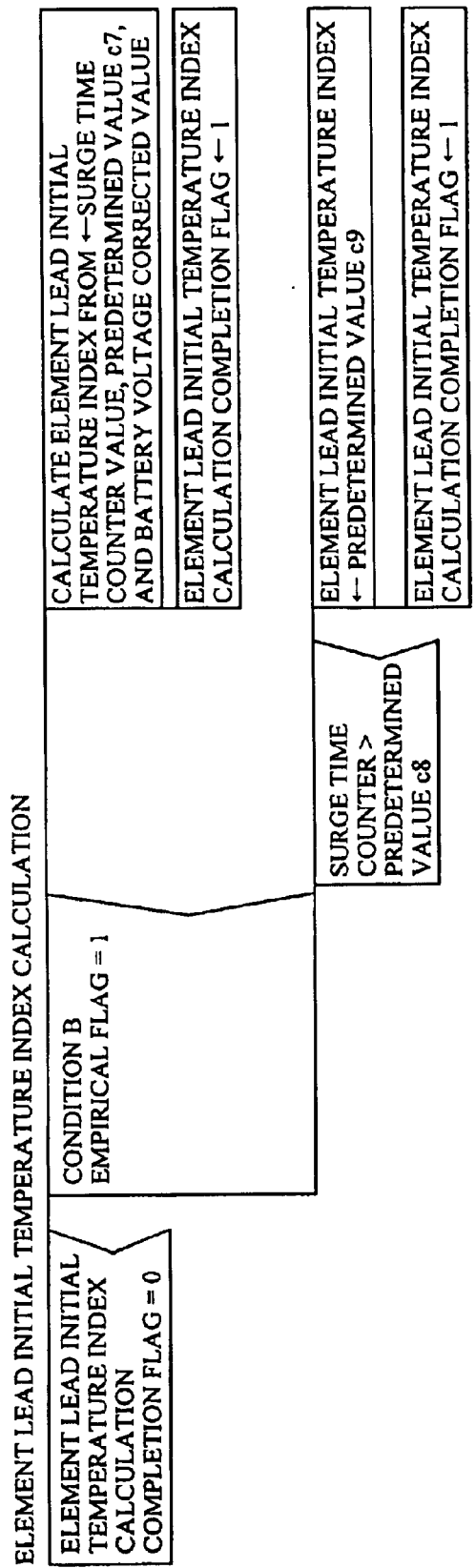
FIG. 9 is a PAD chart of a routine for calculating the element lead initial temperature index in the control system of the internal combustion engine shown in FIG. 1.

FIG. 9 shows a PAD chart of a routine for calculating an element lead initial temperature index. If 'false' is set in the element lead initial temperature index calculation completion flag and 'true' is set in the condition B empirical flag, the routine calculates an element lead initial temperature index from the value in the surge time counter, the predetermined value c7, which is an estimated value of the resetting time, and the battery voltage correction value and sets 'true' in the element lead initial temperature index calculation completion flag.

If 'false' is set in the element lead initial temperature index calculation completion flag and the value in the surge time counter goes over the predetermined value c8, the routine sets a predetermined value c9 for the element lead initial temperature index and 'true' in the element lead initial temperature index calculation completion flag respectively.

Figure 10:
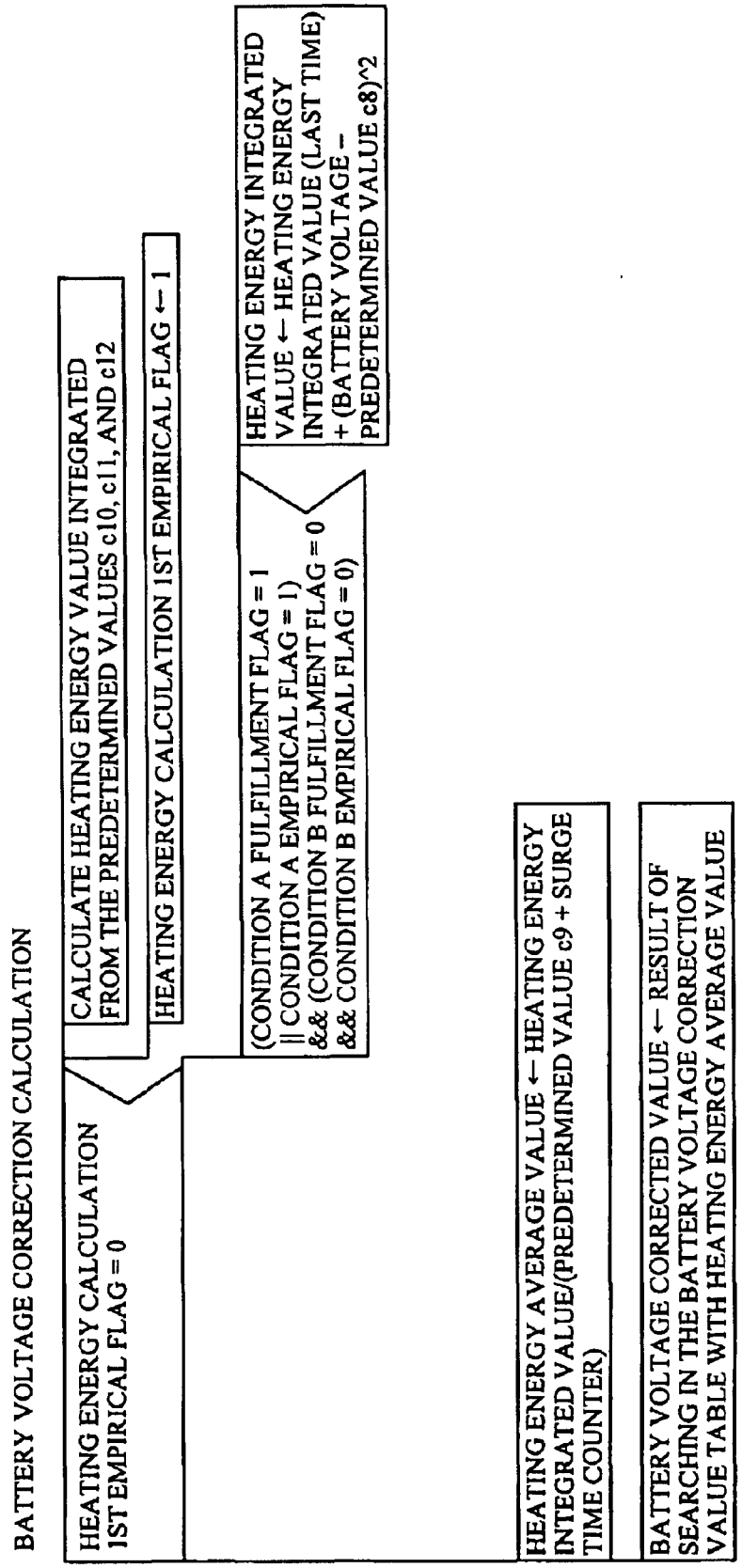
FIG. 10 is a PAD chart of a routine for calculating a battery voltage correction value in the control system of the internal combustion engine shown in FIG. 1.

FIG. 10 shows a PAD chart of a routine for calculating a correction value for a battery voltage. This routine processing is executed just once after the ignition key is turned on while a surge occurs in the air flow sensor output voltage.

If 'false' is set in the heating energy calculation first empirical flag, the processing is determined as the first calculation for integrating heating energy values. Thus, the routine calculates a heating energy integrated value using predetermined values c10, c11, and c12, then sets 'true' in the heating energy calculation first empirical flag.

The heating energy integrated value denotes an integrated value of energy to be supplied to heat the heating resistor 10a of the air flow sensor 10. The predetermined value c10 used for the first calculation of the heating energy integrated value is premised as an estimated battery voltage between a key-on that cannot be estimated and a software/hardware resetting time. The predetermined value c11 is premised as a voltage that falls in the air flow sensor control circuit and the predetermined value c12 is premised as an estimated resetting time.

While 'true' is set in the condition A fulfillment flag or condition A empirical flag and 'false' is set in the condition B fulfillment flag and the condition B empirical flag respectively after 'true' is set in the heating energy calculation first empirical flag, the squared difference between the current battery voltage to be supplied to heat the heating resistor 10a and the predetermined value c11 is added to the previous heating energy integrated value to calculate a new heating energy integrated value.

After that, the heating energy average value is calculated just once from the heating energy integrated value, the predetermined value c12, and the value in the surge time counter when the value in the condition B empirical flag is changed from 'false' to 'true' and the battery voltage correction value is searched in the battery voltage correction value table according to the obtained heating energy average value.

Figure 11:
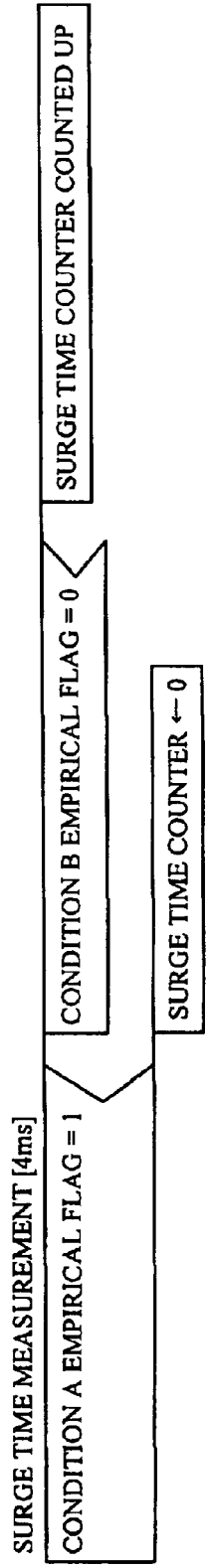
FIG. 11 is a PAD chart of a routine for calculating an element lead initial temperature correction value in the control system of the internal combustion engine shown in FIG. 1.

FIG. 11 shows a PAD chart of a routine for calculating an element lead initial temperature correction value. This routine processing is executed to search an element lead initial temperature correction value in the element lead initial temperature correction value table according to the element lead initial temperature index if 'true' is set in the condition A empirical flag.

Figure 12:
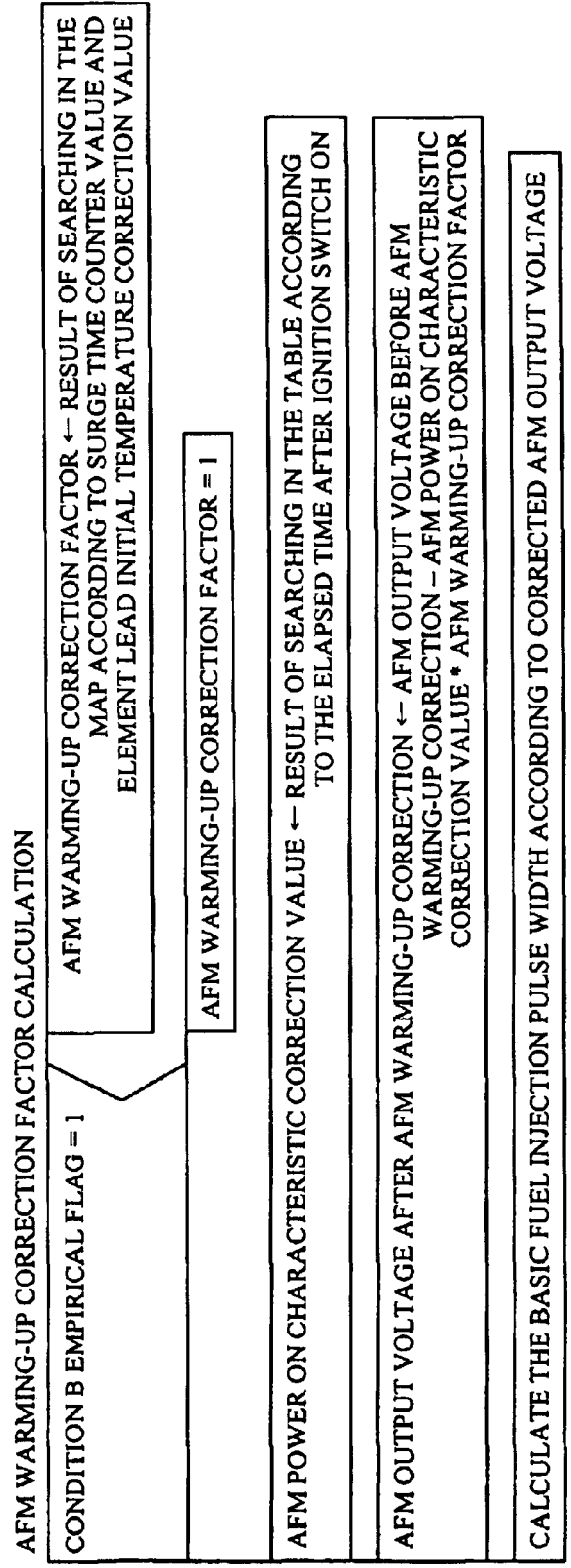
FIG. 12 is a PAD chart of a routine for calculating an AFM warming-up correction factor in the control system of the internal combustion engine shown in FIG. 1.

FIG. 12 shows a PAD chart of a routine for calculating an AFM warming-up correction factor. This routine processing is executed to search an AFM warming-up correction factor in the AFM warming-up correction map according to the value in the surge time counter and the element lead initial temperature correction value if 'true' is set in the condition A empirical flag. In the AFM warming-up correction map, the AFM warming-up correction factor is set closer to 1 as the value in the surge time counter becomes larger. The AFM warming-up correction factor is assumed as 1 when 'false' is set in the condition A empirical flag.

However, if 'true' is not set in the condition A empirical flag even when the value in the elapsed time after key-on counter reaches the predetermined value c3 and over, it is determined that no surge occurs in the air flow sensor output voltage and the AFM is warmed up enough. Thus, the warming-up correction factor is assumed as 1 and no warming-up correction is made. This is because the condition A is not fulfilled if the value in the elapsed time after key-on counter is the predetermined value c3 and over.

Further, the routine searches an AFM power-on characteristic correction value in the AFM power-on characteristic table according to the time elapsed after the ignition is turned on. After that, the product of the AFM warming-up correction factor and the AFM power-on characteristic correction value is subtracted from the AFM output voltage to obtain the AFM output voltage after the warming-up correction.

Further, the routine calculates a basic injection pulse width according to the AFM output voltage after the warming-up correction.

Figure 13:
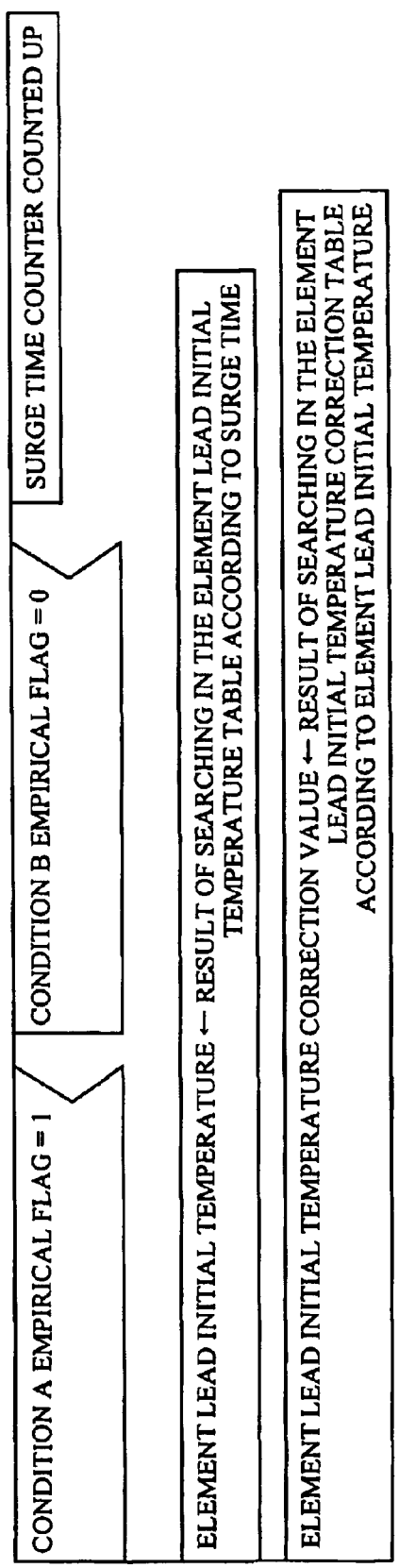
FIG. 13 is a PAD chart of a routine for correcting an element lead initial temperature estimated value in the control system of the internal combustion engine shown in FIG. 1.

FIG. 13 shows a PAD chart of a routine for correcting an element lead initial temperature estimated value. This routine processing is executed to search an element lead initial temperature in the element lead initial temperature table according to the value in the surge time counter. After that, the routine searches an element lead initial temperature correction value in the element lead initial temperature table according to the element lead initial temperature.

While an embodiment of the present invention has been described, it is to be understood that modifications and variations will be apparent to those skilled in the art without departing from the spirit of the invention.

As described above, the control unit of the present invention employed for an internal combustion engine can correct properly an output error to occur just after the thermal type air flow sensor is actuated, so that the intake air amount at the starting time of the engine is detected accurately and the variation of the engine starting time is reduced, thereby the CO and hydrocarbon included in the exhaust gas at the engine starting time is reduced.

What is claimed is:

1. A control system employed for an internal combustion engine and provided with a thermal type air flow sensor output correcting means;

wherein said thermal type air flow sensor output correcting means includes:

a surge time measuring means for measuring a surge time in a value detected by said thermal type air flow sensor when said thermal type air flow sensor is powered; and a supply voltage detecting means;

wherein said output correcting means calculates a warming-up characteristic correction amount for said thermal type air flow sensor according to said measured surge time and said detected supply voltage.

2. A control system employed for an internal combustion engine and provided with a thermal type air flow sensor output correcting means;

wherein said thermal type air flow sensor output correcting means includes:

a surge time measuring means for measuring a surge time in a value detected by said thermal type air flow sensor when said thermal type air flow sensor is powered; and a supply voltage detecting means;

wherein said output correcting means estimates an initial temperature of an element of said thermal type air flow sensor according to said measured surge time and said detected supply voltage to calculate a warming-up characteristic correction amount for said thermal type air flow sensor from said estimated temperature.

3. The control system according to claim 1;

wherein said thermal type air flow sensor output correcting means further includes a correcting means for correcting said measured surge time according to a supply voltage during a surge time measurement.

4. The control system according to claim 1;

wherein said control system calculates a warming-up characteristic correction amount for said thermal type air flow sensor by calculating a squared average value of values obtained respectively by subtracting a predetermined value 1 from said supply voltage during a surge time measurement when said air flow sensor is actuated, then correcting said supply voltage according to said squared average value.

5. The control system according to claim 1;

wherein said control system calculates a squared average value of values obtained respectively by subtracting a predetermined value 1 from said supply voltage during a surge time measurement, estimates a surge time in the normal condition according to said squared average value, and calculates a warming-up characteristic correction amount for said thermal type air flow sensor from said estimated surge time.

6. The control system according to claim 1;

wherein said control system uses a predetermined value 2 as a supply voltage during a reset operation and a total of said measured value and a predetermined value 3 as a surge time for calculating a squared average value of values obtained respectively by subtracting a predetermined value 1 from said supply voltage during a surge time measurement.

7. The control system according to claim 6;

wherein said predetermined value 3 is a total of a standard hardware resetting time of an ECU and a software resetting time.

8. The control system according to claim 6;

wherein said predetermined value 2 is a supply voltage stored in a memory unit provided in said ECU when said ignition switch is on and a engine isn't driven.

9. The control system according to claim 6;

wherein said predetermined value 2 is obtained just after said ECU is powered.

10. The control system according to claim 1;

wherein warming characteristic correction isn't acted for said thermal type air flow sensor when no surge voltage is detected from said thermal type air flow sensor actuated just after said ECU is powered.

11. The control system according to claim 1;

wherein said control system further includes:

intake air flow detecting means other than said thermal type air flow sensor;

determining means for determining whether or not a value detected in said intake air flow detecting means is equal to or smaller than a predetermined value; and correcting means for correcting said warming-up characteristic correction amount for said thermal type air flow sensor;

wherein said correcting means makes warming-up characteristic correction only when said determining means determines that an intake air flow is equal to or smaller than said predetermined value.

12. The control system according to claim 1;
wherein said intake air flow detecting means other than said thermal type air flow sensor uses at least one of throttle opening, accelerator opening, and engine speed.

* * * * *